M. W. Clark
Cutter Head.

No. 102,222. Patented Apr. 26, 1870.

Witnesses: Ned. H. Dodge, Geo. H. Miller

Inventor: Milton W. Clark

United States Patent Office.

MILTON W. CLARK, OF WORCESTER, MASSACHUSETTS, ASSIGNOR TO R. BALL & CO., OF SAME PLACE.

Letters Patent No. 102,222, dated April 26, 1870.

IMPROVEMENT IN CUTTER-HEAD.

The Schedule referred to in these Letters Patent and making part of the same.

*To all whom it may concern:*

Be it known that I, MILTON W. CLARK, of the city and county of Worcester and Commonwealth of Massachusetts, have invented certain new and useful Improvements in Sectional Cutter-Head for Woodworking Machinery; and I do hereby declare the following to be a full, clear, and exact desciption of the same, reference being had to the accompanying drawings forming part of this specification, in which—

Figure 1:
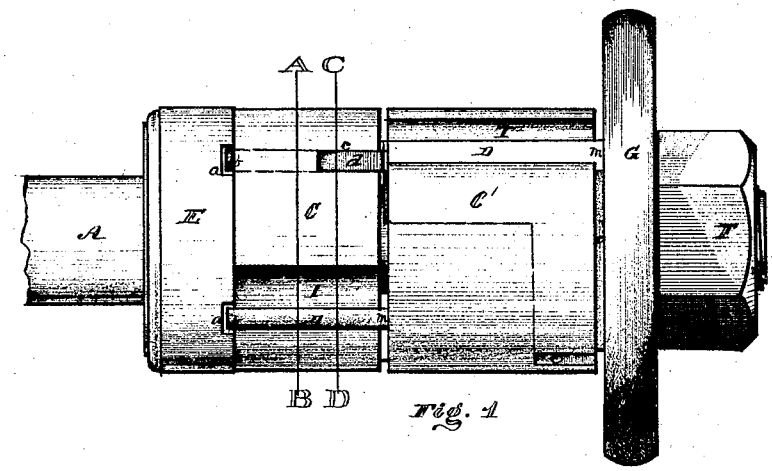
Figure 1 represents a front view of my improved sectional cutter-head.
Figure 2:
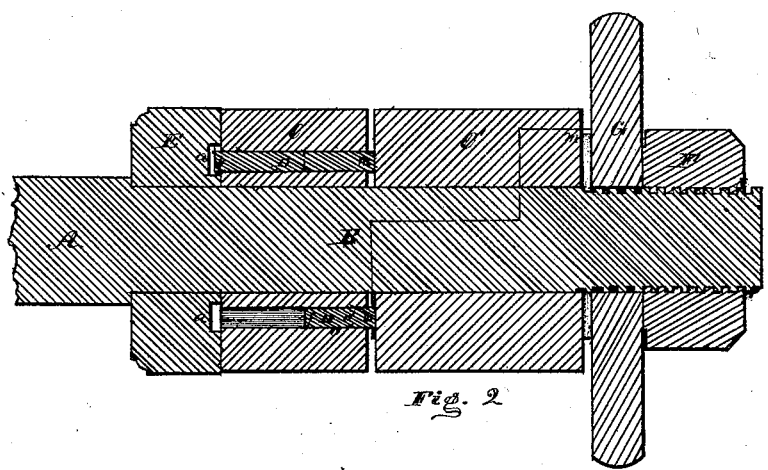
Figure 2 represents a longitudinal central section of the same.
Figure 3:
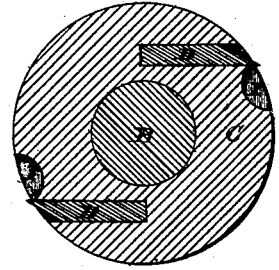
Figure 3 represents a transverse section on line A B, fig. 1.
Figure 4:
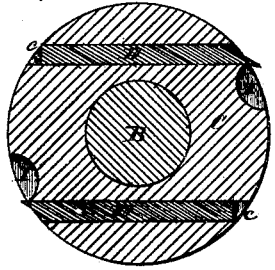
Figure 4 represents a transverse section on line C D, fig. 1.

To enable those skilled in the art to which my invention belongs to make and use the same, I will proceed to describe it more in detail.

My invention consists of a sectional cutter-head for wood-working machines, composed of two or more holding-sections mounted upon the driving-spindle, and constructed to receive and hold the cutters, as hereinafter explained.

In the drawings—

Figure 5:
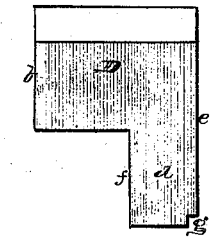
Figure 5 represents a view of one of the cutters.

The part marked A is the driving-shaft, and B is the spindle, whereon are arranged the sections C C' which hold the cutters D, said cutters being made in form as shown in fig. 5.

The cutters D may be made of any desired width, and the holding-sections C C' to correspond in width to their respective cutters.

A collar, E, is shrunk onto the shaft A, to form the base for supporting the sections C C', and channels or grooves, $a$, are formed across the side of said collar E, to allow space for the ends $b$ of the cutters, which project beyond the end of the first section, C. The grooves $a$ are formed of such size that the ends $b$ of the cutters will not come in contact with the collar E at any point.

The sections C C' are made to fit onto the spindle B in such a manner that they can be slipped off and interchanged when desired, by simply removing the check-nut F.

The sections C C' are grooved out at one side, $c$, to receive the shank $d$ of the cutter D.

The holding-sections C C' and cutters D are arranged on the spindle as follows:

The first holding-section, C, being placed in position, as shown, the cutters D, to fit that section, are arranged with their shanks $d$ in the slots $c$, after which the next holding-section, C', is slipped onto the spindle B, so that its inner side will rest or abut against the outer edge $e$ of the cutter D in section C.

The cutters are then arranged in the section C' in the same manner as in the first section, after which the fender and cutter-holder G is placed on the spindle B, and is clamped firmly against the edge of the cutter which is in the section C, by means of the check-nut F, which is screwed onto the end of the spindle B.

It will be seen that the cutters are held in position by their shanks being clamped between the sectional holders, the shanks being made a little wider than the slots $c$, so that their upper edges will project beyond the sides of the sections, as shown at $m$, whereby, when the holding-sections are forced together, the edges $f$ of the shanks will be forced against the bottom of the slots $c$, and securely clamped therein.

To enable the cutters to be set at right angles to each other, and, at the same time, lap by each other, as hereafter explained, the corners of the shanks are notched out, as shown at $g'$, so as not to interfere with the edge $b$ of the cutters in the next section, when in position as indicated in fig. 1.

Semi-cylindrical grooves, I, are formed in the sections, forward of the cutting-edges of the cutters D, to facilitate the clearing of the shavings.

The cutters D are made a little wider than the sections C C', so that they will lap past each other, and thereby insure a clean cut the whole width of the head.

It will also be observed that the head may be composed of sections and cutters of different widths, which can be interchanged, thereby enabling the operator, with a single series of sections and cutters, to cut a great variety of different formed moldings, and that, too, without leaving any burs or fins.

Then again, when the head is made up of several separate sections, the cutters can be arranged spirally around the spindle, thereby rendering the action of the machine more uniform and steady than when the cutters, for the whole width of the head, are brought into contact with the work at the same time.

Thus, it will be seen that my improved sectional cutter-head is peculiarly adapted for use where a wide head is required, since any desired number of sections and cutters can be used, and arranged spirally, or otherwise, as desired.

When it may be desired to reduce the width of a cutter-head, one or more sections, with their cutters, may be removed, and the fender slipped down, and the blank sections placed between the fender G and the check-nut F, to serve the purpose of collars.

Having described my improved sectional cutter-head,

What I claim therein as new and of my invention, and desire to secure by Letters Patent, is—

A sectional cutter-head for wood-working machines, having the holding-sections C C' and cutters D, constructed and arranged upon the driving-spindle B, substantially as herein shown and set forth.

MILTON W. CLARK.

Witnesses:
THOS. H. DODGE,
GEO. H. MILLER.